Figure 1:
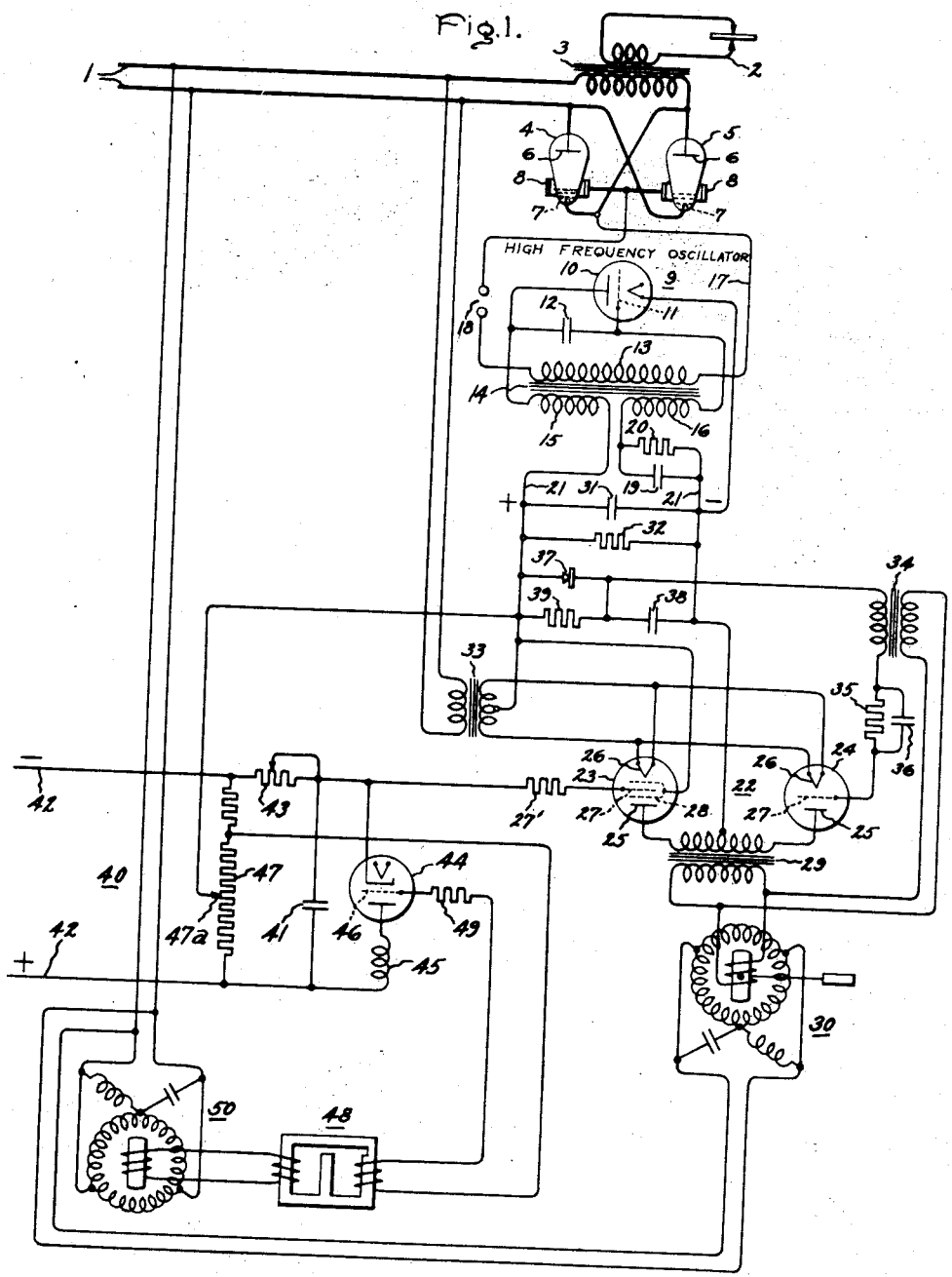

Nov. 18, 1941.       H. W. LORD       2,263,307
            ELECTRIC VALVE CIRCUIT
              Filed May 12, 1939        2 Sheets-Sheet 1

Inventor:
Harold W. Lord,
by Harry E. Dunham
His Attorney.

Patented Nov. 18, 1941

2,263,307

UNITED STATES PATENT OFFICE

2,263,307

ELECTRIC VALVE CIRCUIT

Harold W. Lord, Schenectady, N. Y., assignor to General Electric Company, a corporation of New York Application May 12, 1939, Serial No. 273,261

5 Claims. (Cl. 250—27)

My invention relates to electric translating apparatus and more particularly to control systems for electric valve circuits.

This application is continuation in part of my copending application Serial No. 209,400 entitled "Electric valve circuit," filed May 21, 1938, and assigned to the assignee of the present application.

Electric valve apparatus of the type employing ionizable mediums, because of the facility with which current may be initiated and interrupted by their use, have found considerable application in those fields where it is desired to effect periodic energization of a load circuit from an alternating current circuit, or where it is desired to effect energization of a load circuit from an alternating current circuit during an accurately determinable interval of time. Furthermore, electric valve apparatus of the type employing an ionizable medium and having a control member for initiating the arc discharge have been found particularly adaptable to circuits where it is desired to control the amount of energy transmitted to the load circuit during an interval of time.

Various control circuits have been proposed heretofore to effect the desired precision of operation and to effect positive control. For example, in the energization of the control members of electric valves of this nature, the wave form of the control member energizing voltage has been modified in an effort to effect a positive initiation of the arc discharge. For example, voltages of perpendicular wave front and of peaked wave form have been impressed on the control members to render the electric valves conductive at a precisely determinable time during half cycles of applied anode-cathode voltage. In accordance with the teachings of my invention to be described hereinafter, I provide a new and improved control system for controlling electric valve means whereby there is afforded a positive means for rendering the electric valves conductive.

It is an object of my invention to provide a new and improved electric valve circuit.

It is another object of my invention to provide new and improved electric valve translating apparatus.

It is a further object of my invention to provide a new and improved electric valve control circuit for electric valve translating apparatus.

It is a still further object of my invention to provide a new and improved control system for electric valve means of the type employing an ionizable medium and which comprises high-frequency means for energizing the control members of the electric valve means.

It is a still further object of my invention to provide new and improved electric valve translating apparatus for effecting energization of a load circuit during predetermined recurring intervals.

Briefly described, in the illustrated embodiments of my invention, I provide new and improved electric valve translating circuits for transmitting power or energy, periodically from an alternating current supply circuit of commercial frequency to a alternating current load circuit through a pair of reversely or inversely connected electric valve means, of the type employing an ionizable medium, and which may comprise control members of the starting band type. The control system for energizing the control members comprises a high-frequency electric valve oscillator which impresses on the control members trains of high frequency voltage impulses, the wave front of the train being relatively steep due to the presence of a spark-gap which is connected in the output circuit of the high-frequency oscillator. In one embodiment, the periods of energization of the control members, or, in other words, the periods of energization of the input circuit of the high-frequency oscillator, are controlled by means of a full wave rectifier which is energized from an alternating current source. The full wave rectifier comprises a pair of electronic discharge devices which conduct current alternately and which transmit a rectified alternating current to the input circuit of the oscillator. The electronic discharge devices are arranged in a leading and following relationship and in order to effect energization of the load circuit during a predetermined interval of time, the leading discharge device is rendered conductive by impressing on the control member thereof a transient positive voltage sufficient to overcome the effect of a negative biasing potential which is impressed on the control member.

Another feature of my invention diagrammatically illustrated in the accompanying drawings relates to the employing of a timing circuit for producing a periodic timing electrical quantity which controls the oscillator to effect energization of the load circuit periodically.

Figure 2:
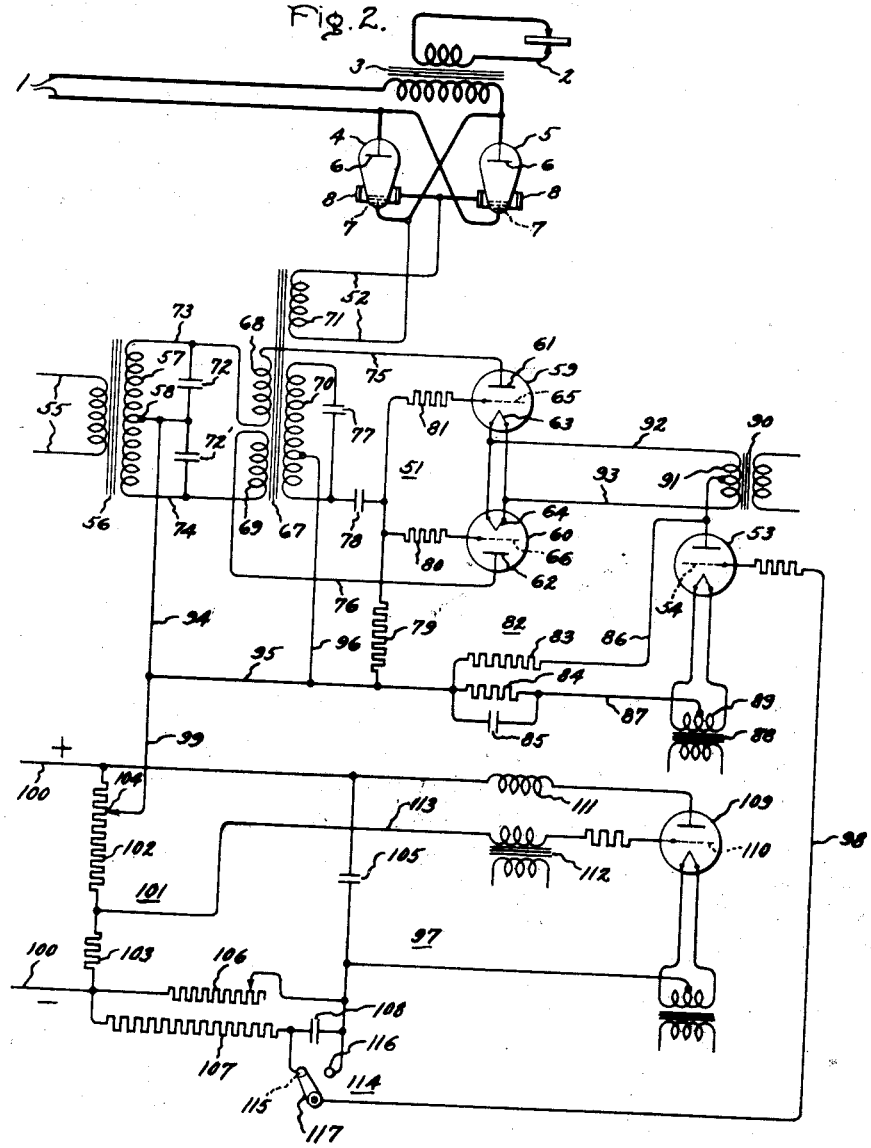

For a better understanding of my invention, reference may be had to the following description taken in connection with the accompanying drawings, and its scope will be pointed out in the appended claims. Figs. 1 and 2 of the accompanying drawings diagrammatically illustrate embodiments of my invention in which the power electric valves are of the type employing external control members of the starting band type.

Referring now to Fig. 1 of the drawings my invention is there shown as applied to an electric valve translating circuit for transmitting energy from an alternating current supply circuit 1 of a commercial frequency to a load circuit, such as a welding circuit 2, through a transformer 3 and a pair of reversely or inversely connected electric valve means 4 and 5. Electric valve means 4 and 5 are connected to transmit both half cycles of current supplied by the supply circuit 1 and hence to transmit alternating current to the welding circuit 2. The electric valve means 4 and 5 are preferably of the type employing an ionizable medium, such as a gas or a vapor, and each has an adode 6 and a cathode 7. The electric valve means 4 and 5 may be of the type comprising control members 8 of the starting band type in which an arc discharge is initiated between the anode 6 and the cathode 7 by impressing upon the control members 8 voltages of sufficient magnitude or having a sufficiently high rate of change.

While the electric valve means 4 and 5 have been shown as being of the type employing control members of the starting band type, it is to be understood that my invention in its broadest aspect may be applied to electric valve means generally irrespective of the nature of the control member.

In order to energize the control members 8 of the electric valve means 4 and 5, I provide a high-frequency generating means such as a high-frequency electric valve oscillator 9. The electric valve oscillator 9 comprises an electric valve 10, of the high vacuum type, having a grid 11, a capacitance 12 and an inductance 13 which may be a winding of a transformer 14. The electric valve 10, the capacitance 12, the inductance 13 and capacitance 31 constitute the principal elements of the high-frequency electric valve oscillator. Transformer 14 also includes windings 15 and 16, the former of which is connected to the anode of the electric valve 10 and the latter of which is connected to the gird 11 of the electric valve 10. To impress on the control members 8 steep wave front trains of high-frequency electrical impulses, I introduce into the output circuit 17 of the electric valve oscillator 9 a suitable means such as a spark-gap 18. The spark-gap 18 breaks down when the voltage of the oscillator 9 attains a predetermined value to impress on the control members steep front trains of high-frequency electrical impulses. A suitable biasing means, such as a self-biasing circuit, comprising a parallel connected capacitance 19 and a resistance 20 is connected in series relation with winding 16 and in circuit with grid 11 of electric valve 10. The input circuit 21 of the oscillator 9 is energized from a circuit described hereinafter.

I have found that the electric valves 4 and 5 are controlled in a positive manner by impressing on the control members 8 a relatively high frequency alternating voltage of approximately three thousand cycles. The electric valve oscillator 9 may be designed to be adjustable so that the output voltage and the output frequency may be varied. The secondary winding 13 of transformer 14 is preferably a high voltage winding capable of supplying about six thousand volts. It is to be understood that the design of the electric valve oscillator 9 is preferable in accordance with the breakdown characteristics of the spark-gap 18. Although I have found that satisfactory operation is obtained for the above mentioned values of frequency and voltage, it is to be understood that my invention is not limited to an arrangement employing these values but may in its broader aspects cover generally control circuits for electric valve apparatus in which a high frequency generator energizes the control members of electric valve means.

To energize the input circuit 21 of the electric valve oscillator 9 and hence to control the electric valve means 4 and 5, I provide a rectifier circuit 22 which may be of the full wave type and which may comprise a pair of electronic discharge devices 23 and 24. By the term "full wave" is meant that type of rectifying circuit which rectifies both the positive and negative half cycles of voltage of the associated alternating current circuit. Electronic discharge devices 23 and 24 are preferably of the type employing an ionizable medium and each comprises an anode 25, a cathode 26 and a control member or grid 27. A current limiting resistance 27' may be connected in series relation with grid 27. A shield grid 28 may be employed, if desired. The anode-cathode circuits of the electronic discharge devices 23 and 24 are energized from a transformer 29 and the electric valves 23 and 24, of course, are connected to conduct current alternately. The transformer 29 may be energized from any suitable source of alternating current of the proper phase and frequency and in the drawings is shown as being energized from the alternating current supply circuit 1 through a suitable phase shifting means, such as a rotary phase shifter 30. The phase shifter 30 is adjusted to impress on the anodes 25 of electronic discharge devices 23 and 24 a voltage which leads the voltage of circuit 1 by an appreciable angle so that the voltage impressed on circuit 21 is of sufficient value to set the high frequency oscillator 9 into operation at the time dictated by the control circuit described hereinafter. I have found that an angle of lead of substantially 30 electrical degrees is satisfactory. The electronic discharge devices 23 and 24 are connected to the input circuit 21 of the electric valve oscillator 9 and develop across a capacitance 31 and a resistance 32 a voltage of the polarity indicated. Capacitance 31 constitutes, with the inductance 13, a tank circuit for the oscillator 9. It will be understood that the voltage appearing across capacitance 31 and resistance 32 is a rectified alternating voltage. The cathodes 26 of the electronic discharge devices 23 and 24 may be energized from the supply circuit 1 through a cathode heating transformer 33.

Electronic discharge devices 23 and 24 are arranged in a leading and following relationship. That is, the electronic discharge device 24 is arranged to follow the discharge device 23 and to conduct current during only the half cycles immediately following the half cycles of conduction of discharge device 23. This control is effected by means of a circuit including a transformer 34 which impresses on the grid 27 of discharge device 24 an alternating potential which biases the discharge device 24 to a nonconducting condition, or, in other words, it maintains the device 24 nonconductive. A suitable source of negative unidirectional biasing potential is provided by a conventional means, such as a parallel connected resistance 35 and a capacitance 36, which produces the negative biasing potential by virtue of the grid rectification characteristic of the device 24. To overcome the effect of the biasing potential produced by transformer 34, resistance 35 and capacitance 36 and to render the electronic discharge device 24 conductive during the half cycles of voltage immediately following the half cycles of conduction of electronic discharge device 23, I provide a circuit including a suitable unidirectional conducting device 37 and a capacitance 38. The capacitance 38 is charged from the circuit 21 through the unidirectional conducting device 37 when the electronic discharge device 23 conducts current. The lefthand plate of the capacitance 38 becomes positive and impresses a positive voltage on grid 27 of discharge device 24 through transformer 34 and resistance 35 to render discharge device 24 conductive. A discharge circuit for capacitance 38 is provided and includes a resistance 39 which permits discharge of the capacitance 38 into the circuit 21. This discharge circuit is proportioned so that the positive voltage produced by the capacitance 38 is not effective for an interval of time exceeding a half cycle of voltage of the alternating current circuit 1. In this manner, the discharge device 24 conducts current during only those half cycles immediately following the half cycles of conduction of discharge device 23.

I provide a timing circuit 40 for producing a periodic electrical quantity, such as a periodic voltage, for effecting energization of the load circuit 2 during predetermined recurring intervals of time by controlling the operation of the high frequency oscillator 9. The timing circuit 40 may be any of the conventional types well known in the art, and I have chosen to employ a circuit including a capacitance 41 which is charged from a suitable source of current, such as a direct current circuit 42, through an adjustable resistance 43. The timing circuit 40 also includes an electric valve means 44 and an inductance 45 for periodically discharging the capacitance 41. The electric valve means 44 is preferably of the type employing an ionizable medium, such as a gas or a vapor, and comprises a control member or grid 46 which renders the electric valve means 44 conductive. One terminal of the timing circuit 40 is connected to the grid 27 of the electronic discharge device 23 and impresses thereon a periodic control voltage which renders the electronic discharge device 23, and consequently the electronic discharge device 24, conductive periodically to control the oscillator 9 to effect energization of the load circuit 2 during periodic recurrent intervals. The timing circuit 40 also includes a voltage divider including a resistance 47 having an adjustable tap 47a which is connected to the positive terminal of the input circuit 21 of the oscillator 9.

In order to initiate energization of the load circuit 2 at a predetermined desired time during the cycles of voltage of the alternating current circuit 1, I provide means for impressing on the grid 46 of electric valve means 44 a voltage of perpendicular wave front or peaked wave form, in this manner effecting energization of the load circuit at a time which incurs a minimum starting transient. For example, I may employ a suitable device for producing a voltage of peaked wave form, such as a peaking transformer 48, which may be of the saturable type designed to produce a voltage of peaked wave form. A suitable current limiting resistance 49 may be connected in series relation with the transformer 48 and the grid 46. As a means for adjusting the time at which the periodic impulses produced by the timing circuit 40 occur, I employ a suitable means, such as a rotary phase shifting device 50, for controlling the phase of the voltage supplied to the peaking transformer 48.

The operation of the embodiment of my invention shown in Fig. 1 will be explained by considering the system when it is operating to effect periodic energization of the load circuit 2 during recurrent intervals. The electric valve means 4 and 5 are rendered conductive when the oscillator 9 is generating high frequency impulses and effecting the establishment of cathode spots on the mercury pool cathodes 7 thereof. The periods of operation of the oscillator 9 are, of course, determined by the periods of energization of the input circuit 21 and these periods are determined by the periods of conductivity of the electronic discharge devices 23 and 24 which supply substantially unfiltered unidirectional impulses of current to the input circuit 21. The electric valves 4 and 5 are in a nonconducting condition until the high frequency voltage is impressed on the control members 8. So long as the high frequency voltage is impressed on the control members 8, the electric valves 4 and 5 are rendered conductive to conduct current alternately thereby transmitting alternating current to the welding circuit 2.

The periods during which the electric valves 4 and 5 are rendered conductive depend upon the operative periods of the rectifier 22 which, in turn, is controlled by the circuit 40. The voltage impressed on the input circuit 21 of the electric valve oscillator 9 is a rectified alternating voltage and so long as this voltage is present, the control members 8 of electric valves 4 and 5 are energized. Due to the fact that the voltage of circuit 21 is a pulsating voltage, the high frequency output voltage of the electric valve oscillator 9 is modulated in magnitude in accordance with the input voltage. The spark gap 18 assures that the trains of voltage impulses impressed on the control members 8 are of a predetermined magnitude and are of steep wave front, thereby assuring positive initiation of arc discharges in electric valves 4 and 5.

It will be noted that control grid 27 of the electronic discharge device 23 is connected to the negative terminal of circuit 42, and that a predetermined negative component of voltage derived from circuit 42 is impressed across the cathode 26 and the control grid 27, thereby tending to maintain the electronic discharge device 23 non-conductive except during those intervals in which the periodic voltage generated by circuit 40 overcomes the effect of this negative biasing voltage.

The manner in which the timing circuit 40 operates to produce a periodic voltage of predetermined periodicity will be well understood by those skilled in the art. The periodicity of the impulses produced by the timing circuit 40 is determined primarily by the setting of the adjustable resistance 43, and the duration of the positive portion of the periodic voltage is determined by the setting of the adjustable contact 47a. By adjustment of contact 47a, the ratio of the periods of conduction to the periods of nonconduction of the electronic discharge device 23a is controllable, and accordingly the length of the periods of energization and the length of the periods between the periods of energization of the load circuit 2 are also controllable.

Fig. 2 diagrammatically illustrates another embodiment of my invention, applied to a system similar to that shown in Fig. 1, for energizing a welding circuit 2 from an alternating current supply circuit 1 of commercial frequency. Corresponding elements have been assigned like reference numerals. In the embodiment of my invention shown in Fig. 2, I provide an oscillator 51 of the type described and claimed in United States Letters Patent No. 2,098,051, granted November 2, 1937, upon my application filed March 16, 1936, and which is assigned to the assignee of the present application. The oscillator 51 transmits trains of high frequency electrical impulses to the control members 8 of the electric valve means 4 and 5, through circuit 52, to render these electric valve means conductive periodically. The electric valve means 4 and 5 are connected inversely or reversely in parallel relationship with each other. These electrical impulses may be of a frequency substantially greater than that of the ordinary commercial alternating current circuit. I employ an electronic discharge device 53 of the gaseous type having a control member 54 to control the oscillator 51 which is of the self-rectifying type.

The oscillator 51 may be energized from any relatively low frequency alternating current circuit 55 or from supply circuit 1, through a transformer 56 having a secondary winding 57 provided with a mid-tap connection 58. Electric valves 59 and 60 having anodes 61 and 62, cathodes 63 and 64 and control members 65 and 66, respectively, are employed in the oscillator circuit 51 to rectify the alternating potential of source 55 and also serve the purpose of generating the high frequency oscillations. A multi-winding high frequency transformer 67 having primary windings 68 and 69 and secondary windings 70 and 71 is used to impress the voltage appearing across the secondary winding 57 of transformer 56 on anodes 61 and 62 of electric valves 59 and 60, respectively. Transformer 67 also serves the purpose of supplying the necessary inductive reactance for the oscillator 51. Capacitances 72 and 72' are connected between the upper and lower terminals, respectively, and the mid-connection 58 of secondary winding 57 of transformer 56. The anodes 61 and 62 of electric valves 59 and 60, respectively, are connected to the secondary winding 57 of transformer 56 through conductors 73 and 74, windings 68 and 69 and conductors 75 and 76 respectively. A capacitance 77 is connected across the secondary winding 70 of transformer 67 and serves as a part of the high frequency oscillation circuit.

A self-biasing circuit for energizing the control members 65 and 66 of electric valves 59 and 60 comprises a capacitance 78 and a resistance 79. Current limiting resistances 80 and 81 are connected in series with control members 66 and 65 of electric valves 60 and 59, respectively, and also serve to suppress parasitic oscillations.

To control the oscillator 51 and to render the electronic discharge device 53 nonconductive at the end of each half cycle of rectified potential of the alternating current circuit 55, I employ a circuit 82 comprising an impedance element, such as a resistance 83, and a resistance 84 and a capacitance 85 connected across the resistance 84. The resistance 83 is connected to the anode of electronic device 53 through a conductor 86, and to the cathode through the parallel circuit comprising resistance 84 and capacitance 85, conductor 87 and a secondary winding 89 of a cathode heating transformer 88. The anode of vapor electric valve 53 is connected to the cathodes 63 and 64 of valves 59 and 60, respectively, through the secondary winding 91 of a cathode heating transformer 90 and conductors 92 and 93. The mid-connection 58 of secondary winding 57 is connected to the left-hand terminals of resistances 83 and 84 and capacitance 85 through conductors 94 and 95. Conductor 96 is employed to connect the lower terminal of resistance 79 in the self-biasing circuit to a mid-connection of secondary winding 70 of the high frequency transformer 67.

The timing circuit 97 may be used to control periodically the conductivity of the electronic discharge device 53 and thereby to effect control of the oscillator 51. By means of the timing circuit 97, a periodic timing potential of suitable wave form is impressed across the control member 54 and the cathode of valve 53 through a conductor 98 and a conductor 99, conductor 95, resistance 84, conductor 87 and secondary winding 89. The timing circuit 97 diagrammatically illustrated in Fig. 2 of the drawings comprises a source of direct current 100, a voltage divider 101 including resistances 102 and 103, the former having an adjustable contact 104, a capacitance 105, a resistance 106, an auxiliary discharge circuit comprising a serially-connected resistance 107 and a capacitance 108 and a means for periodically discharging capacitance 105 such as a vapor electric discharge valve 109 having a control member 110. An inductive element 111 is connected in series with valve 109 to assist in the control of the valve 109, and a transformer 112, preferably of the type designed to supply a voltage of peaked wave form, is connected in the control member circuit for electric valve 109 to render the valve 109 conductive precisely at predetermined times. The transformer 112 may be energized from the alternating current source 55 or other suitable source to control the period of the periodic potential of circuit 97, thereby effecting coordination between the control of electronic device 53 and the alternating potential of source 55. A switch 114, having stationary contacts 115 and 116 connected to the terminals of capacitance 108 and a movable member 117, is employed to obtain an adjustment in the ratio of the period of nonconduction to the period of conduction of electronic device 53. When the movable member 117 of switch 114 is in contact with the stationary member 115, the periodic peaked potential impressed on the control member 54 of device 53 is of relatively short duration effecting thereby a high ratio of the period of nonconduction to the period of conduction. Whereas, when the movable member 117 is connected to contact 116 the periodic peaked potential is of longer duration to effect thereby an increase in the period of conduction of device 53 and a decrease in the ratio of the period of nonconduction to the period of conduction.

The operation of the embodiment of my invention shown in Fig. 2 is substantially the same as that explained above in connection with Fig. 1. The oscillator 51 transmits trains of high frequency electrical impulses to the control members 8 of the electric valve means 4 and 5 through circuit 52 to render the electric valve means conductive periodically and to effect thereby periodic energization of the load circuit 2. The periodicity of the energization of the load circuit 2 may be controlled by the adjustment of resistance 106, and the duration of the periods of energization and the intervening periods of deenergization is controllable or adjustable by means of the movable contact 104.

While I have shown and described my invention as applied to particular systems of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, an alternating current supply circuit, a load circuit, electric translating apparatus for energizing said load circuit from said supply circuit and comprising electric valve means having a control means, a high frequency generator for energizing the control means to render said electric valve means conductive, means for controlling the energization of said generator and including an electronic discharge device having a control grid, and a timing circuit for impressing a periodic electrical quantity upon said grid to effect periodic energization of said generator.

2. In combination, an alternating current supply circuit, a load circuit, electric translating apparatus for energizing said load circuit from said supply circuit and comprising a pair of inversely connected electric valve means each having a control means, a high frequency generator for energizing the control means to render said electric valve means conductive, means for energizing said generator from said supply circuit and including an electronic discharge device having a control grid, means for impressing a biasing voltage on said control grid tending to maintain said device nonconductive, and a timing circuit for impressing on said grid a voltage sufficient to overcome periodically said biasing voltage to render said electronic discharge device conductive and to effect periodic energization of said load circuit.

3. In combination, an alternating current supply circuit, a load circuit, electric translating apparatus for energizing said load circuit from said supply circuit and comprising electric valve means having control means, a high frequency electric generator for energizing the control means to render said electric valve means conducting, means for controlling the energization of said generator and including an electronic discharge device having a grid, and an electric valve timing circuit for impressing on said grid a periodic voltage to effect periodic energization of said load circuit during a predetermined number of half cycles of voltage of said supply circuit and to maintain said load circuit deenergized for a predetermined number of succeeding half cycles of voltage of said supply circuit.

4. In combination, an alternating current supply circuit, a load circuit, electric translating apparatus for energizing said load circuit from said supply circuit and comprising electric valve means having control means, a high frequency electric generator for energizing the control means to render said electric valve means conducting, means for controlling the energization of said generator including an electric valve rectifier energized from said supply circuit, and an electric valve timing circuit for producing a periodic electrical quantity which determines the periodicity of the energization of said load circuit.

5. In combination, an alternating current supply circuit, a load circuit, electric translating apparatus for transmitting trains of electrical impulses to said load circuit and comprising electric valve means having control means, a high frequency generator for energizing the control means to render said electric valve means conducting, means for controlling the energization of said generator including a rectifier energized from said supply circuit and comprising an electronic discharge device having a control grid, and an electric valve timing circuit for impressing a periodic electric quantity upon said grid to control the periodicity of the trains of electrical impulses transmitted to said load circuit and for controlling the interval of time between the trains of impulses.

HAROLD W. LORD.